US012154414B2

(12) United States Patent
Berman

(10) Patent No.: US 12,154,414 B2
(45) **Date of Patent: *Nov. 26, 2024**

(54) GAMING DEVICES AND METHODS IMPLEMENTING DYNAMICALLY MODIFIABLE SOURCES OF GAME PLAY ITEMS

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/991,573

(22) Filed: Nov. 21, 2022

(65) Prior Publication Data

US 2023/0087565 A1 Mar. 23, 2023

Related U.S. Application Data

(63) Continuation of application No. 16/683,937, filed on Nov. 14, 2019, now Pat. No. 11,508,218.

(60) Provisional application No. 62/767,741, filed on Nov. 15, 2018.

(51) Int. Cl.
*G07F 17/32* (2006.01)

(52) U.S. Cl.
CPC ...... *G07F 17/3293* (2013.01); *G07F 17/3262* (2013.01)

(58) Field of Classification Search
CPC ......................... G07F 17/3293; G07F 17/3262
See application file for complete search history.

(56) References Cited

U.S. PATENT DOCUMENTS

| | | | |
|---|---|---|---|
| 6,439,574 | B1 | 8/2002 | Robinson |
| 7,926,813 | B2 | 4/2011 | Moody |
| 8,323,085 | B2 | 12/2012 | Berman et al. |
| 8,403,737 | B1 | 3/2013 | Friedman |
| 8,998,693 | B1 | 4/2015 | Friedman |
| 2004/0023706 | A1 | 2/2004 | Hunter et al. |
| 2007/0066377 | A1 | 3/2007 | Asdale |
| 2014/0370954 | A1 | 12/2014 | Jackson |

OTHER PUBLICATIONS www.888casino.com, “Quick Quads Poker”, Mar. 7, 2018.
www.nwitimes.com, IGT “Stacks the Deck”, by John G. Brokopp, Dec. 7, 2017.

*Primary Examiner* — David L Lewis
*Assistant Examiner* — Robert E Mosser

(57) ABSTRACT

Systems, apparatuses and methods for enriching modifiable sources of game play items during play of the gaming activity. In a video poker embodiment, cards of the deck(s) that source the poker hand(s) may be modified during play of the poker game. In one embodiment, the deck(s) of cards changes, in some embodiments randomly, and in some embodiments geared towards the probability of the player obtaining a more favorable poker hand outcome, while in yet other embodiments ensuring a higher probability of the player obtaining a more favorable poker hand outcome. Cards in the sourcing deck(s) may be added and/or deleted or otherwise modified to statistically impact the odds of obtaining certain results from the poker game. The deck may be reset to an initial state, or backed off from the modifications, at one time or iteratively.

19 Claims, 10 Drawing Sheets

GAMING DEVICES AND METHODS IMPLEMENTING DYNAMICALLY MODIFIABLE SOURCES OF GAME PLAY ITEMS

RELATED APPLICATIONS

This application is a continuation of U.S. application Ser. No. 16/683,937, filed Nov. 14, 2019, which claims the benefit of Provisional Patent Application No. 62,767,741 filed on Nov. 15, 2018, to which priority is claimed pursuant to 35 U.S.C. § 119(e) and which is incorporated herein by reference in its entirety.

FIELD

This disclosure relates generally to games, and more particularly to systems, apparatuses and methods for facilitating modifiable sources of game play items during play of the gaming activity.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is due to the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes systems, apparatuses and methods that facilitate new and interesting gaming experiences, and provide advantages over the prior art.

SUMMARY

The present disclosure is directed to systems, apparatuses, computer-readable media, and/or methods that are configured to facilitate modifiable sources of game play items during play of the gaming activity.

In a video poker embodiment, cards of the deck(s) that source the played poker hand(s) may be modified during play of the poker game. In one embodiment, the deck(s) of cards changes, in some embodiments randomly, and in some embodiments geared towards the probability of the player obtaining a more favorable poker hand outcome, while in yet other embodiments ensuring a higher probability of the player obtaining a more favorable poker hand outcome. Cards in the sourcing deck(s) may be added and/or deleted or otherwise modified to statistically impact the odds of obtaining certain results from the poker game. The deck may be reset to an initial state, or backed off from the modifications, in any desired manner.

In one embodiment, a gaming device is provided for playing an electronic poker game. The gaming device includes a display(s) presenting one or more poker hands to play. A user interface is provided that includes at least one user input to enable a player to initiate and participate in poker hands presented via the display. A wager input device may be provided, which may be structured to identify and validate player assets and ultimately permit the player to play the poker games/hands when the player assets are provided. In this embodiment, a processor is configured to provide a deck(s) of cards as a source of cards for a current poker game, to identify one or more cards to add to the deck of cards based on deck modification criteria, and to add those identified cards to the deck to provide a modified deck of cards used to source one or more subsequent poker games. The processor is configured to facilitate play of the subsequent poker games using the modified deck of cards. The processor monitors for occurrence of a termination event, and if no termination event is identified, the player can continue to play poker games using the modified deck of cards. When the termination event occurs, the processor is configured to remove the added cards from the modified deck of cards to reset the modified deck of cards to the deck of cards.

In accordance with a more particular embodiment of such a gaming apparatus, the processor is further configured to remove one or more of the cards of the modified deck of cards in parallel with the capability to continue to add additional cards to the modified deck of cards.

In another embodiment of such a gaming apparatus, the processor is configured to identify one or more cards to add to the deck of cards based on play-based deck modification criteria, which is based on at least one or more of the cards involved in the current poker game. In a more particular embodiment, the processor is configured to identify the cards to add to the deck of cards by adding the cards of the current poker game that are involved in a winning outcome. In another representative embodiment, the processor is configured to identify the cards to add to the deck of cards by adding the cards of the current poker game that are face cards. In still another representative embodiment, the processor is configured to identify the cards to add to the deck of cards by adding the cards of the current poker game that are among a predetermined group of one or more special cards (e.g. Wild cards; cards associated with a Royal Flush; cards associated with a Flush; etc.).

In another embodiment of such a gaming apparatus, the processor is configured to identify the cards to add to the deck of cards by adding the cards of the current poker game that the player previously designated as the cards to add to the modified deck when those cards arise in connection with the current poker game.

In another embodiment of such a gaming apparatus, the processor is configured to identify the cards to add to the deck of cards based by adding the cards of the current poker game that are marked by indicators.

In yet another embodiment of such a gaming apparatus, the termination event relates to a number or "count" of subsequent poker games played, where the processor is configured to remove the added cards from the modified deck to reset the modified deck to the original deck of cards in response to the identification of the number of the subsequent poker games being played. In an embodiment, the termination event relates to an expiration of a time period during play of the subsequent poker games, where the processor is configured to remove the added cards from the modified deck to reset the modified deck to the original deck of cards in response to the identification of the expiration of the time period. In yet another embodiment, the termination event relates to a triggering event based on one or more particular cards or card groups occurring during play of the subsequent poker games, where the processor is configured to remove the added cards from the modified deck to reset the modified deck to the original deck of cards in response to the triggering event. In other embodiments, the modified deck may remove one or more cards to move the modified deck back towards the original deck of cards, without it fully resetting to the original deck of cards.

In another embodiment of such a gaming apparatus, the deck(s) of cards is one standard deck of fifty-two cards of four card suits, each card suit including thirteen cards, where the modified deck of cards has more than fifty-two cards with one or more of the cards being duplicates. In another embodiment, the deck(s) of cards is one standard deck of fifty-two cards of four card suits, each card suit including thirteen cards, where the modified deck of cards has more than fifty-two cards with one or more of the cards being Wild cards. In still another embodiment, the deck(s) of cards is one standard deck of fifty-two cards of four card suits, each card suit including thirteen cards, where the modified deck of cards still includes fifty-two cards, but with one or more of the cards being replaced with Wild cards.

In another embodiment, a gaming apparatus for playing an electronic poker game is provided. The representative gaming apparatus includes at least a display(s) presenting a single or multiple poker hands. A user interface is provided that includes at least one user input to enable a player to initiate and participate in poker hands presented via the display. A wager input device may be provided, which may be structured to identify and validate player assets and ultimately permit the player to play the poker game events when the player assets are provided. In this embodiment, a processor is configured to provide at least one standard deck of cards used to source a current one of the poker games. The processor is configured to identify one or more cards to modify the deck of cards based on deck modification criteria, and to modify the deck of cards based on those identified one or more cards to provide a modified deck of cards to source one or more subsequent poker games. The processor is configured to facilitate play of the one or more subsequent poker games using the modified deck of cards. In response to determining the occurrence of a termination event, the processor is configured to reverse at least some of the modification made to the deck of cards, based on the identified one or more cards, to move the modified deck of cards back towards the standard deck of cards.

In one embodiment of such a gaming apparatus, the processor is configured to modify the deck of cards by adding one or more cards to the standard deck of cards to provide the modified deck of cards. In another embodiment, the processor is configured to modify the deck of cards by removing one or more cards to the standard deck of cards to provide the modified deck of cards. In still another embodiment, the processor is configured to modify the deck of cards by adding and/or removing one or more cards to the standard deck of cards to provide the modified deck of cards.

In another embodiment of such a gaming apparatus, the processor is configured to modify the deck of cards by skipping the dealing of one or more cards during play of the one or more subsequent poker games to provide the modified deck of cards.

In another embodiment of such a gaming apparatus, the processor is configured to identify occurrence of a second termination event, and in response thereto, to remove one or more additional ones of the added cards from the modified deck of cards to further move the modified deck of cards back towards the standard deck of cards. In a more particular embodiment, the processor is configured to modify the deck of cards by adding one or more cards to the standard deck of cards in parallel with the removing of the one or more additional ones of the added cards from the modified deck of cards to update the modified deck of cards.

This summary serves as an abbreviated, selective introduction of a representative subset of various concepts and embodiments that are further described or taught to those skilled in the art in the Specification herein. This summary is not intended to refer to all embodiments, scopes, or breadths of claims otherwise supported by the Specification, nor to identify essential features of the claimed subject matter, nor to limit the scope of the claimed subject matter.

DETAILED DESCRIPTION

Figure 1:
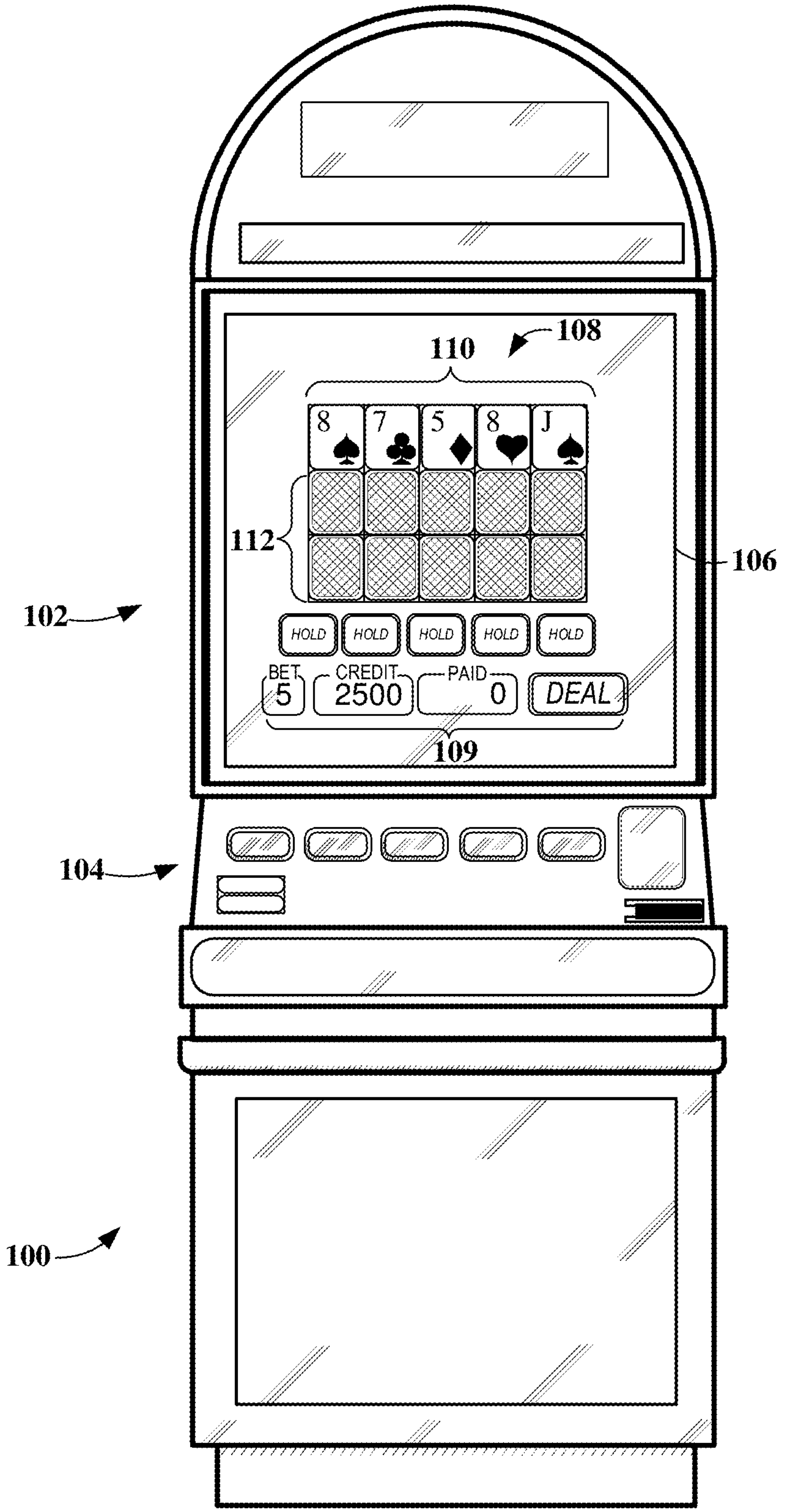
FIG. 1 is a diagram of a representative gaming machine capable of facilitating player use and interaction with games and features in accordance with the invention and representative embodiments described herein.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms “reels,” “cards,” “decks,” and similar mechanically descriptive language may be used to describe various apparatus presentation features, as well as various actions occurring to those objects (e.g., “spin,” “draw,” “hold,” “bet”). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms “cards,” “decks,” “reels,” “hands,” etc., are intended to describe both physical objects and emulation or simulations of those objects and their behaviors using electronic apparatuses.

In various embodiments, the gaming displays are described in conjunction with the use of data in the form of “symbols.” In the context of this disclosure, a “symbol” may generally refer at least to a collection of one or more arbitrary indicia or signs that have some conventional or defined significance. In particular, the symbol may represent values that can at least be used to determine whether to award a payout. A symbol may include numbers, letters, shapes, pictures, textures, colors, sounds, etc., and any combination therebetween. A play state, such as a win, can be determined by comparing the symbol with one or more other symbols. Such comparisons can be performed, for example, via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are disclosed for facilitating modifiable sources of game play items during play of the gaming activity. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in standalone games, multi-player games, etc. Further, the disclosure may be applied to games of chance, and descriptions provided in the context of any representative game (e.g. poker, such as video poker) is provided for purposes of facilitating an understanding of the features described herein. However, the principles described herein are equally applicable to any game of chance where an outcome(s) is determined for use in the player’s gaming activity.

Embodiments of the present concept include providing gaming devices (also referred to as gaming apparatuses or gaming machines), gaming systems, and methods of operating these devices or systems to provide game play that involves changing the symbol or other game play indicia from a preset state to change the likelihood of particular symbols/game play items being presented in connection with certain gaming events of the gaming activity. For example, in the context of video poker, the deck (or decks in some embodiments) of cards that serve as the source for the poker hands may be modified during play of the poker game, and in some embodiments remain in that modified state until some other event or trigger occurs (e.g., elapsed time, number of hands played, certain result(s) occurs, certain card(s) presented during play, random termination, etc.). While the deck is modified, the chances of getting particular results that correspond to winning poker hands (e.g., those poker hands corresponding to a winning payout) are different than when the deck is in its unmodified state, whether those chances are better, worse, or otherwise different.

While the disclosure herein is often described in terms of poker, or video/electronic poker specifically in some embodiments, the disclosure is also applicable to other games of chance that involve a source of game play items, such as other card games, slot games, keno, bingo, roulette, etc. In one embodiment, the gaming activity comprises a card poker game, which may involve a single hand of cards or multiple hands of cards. The cards serve as the indicia that enables games to be conducted, through interaction of the card indicia. Cards in a current gaming activity may be added and/or removed from the deck (or any card source) to potentially enrich, or at least change, the odds of getting particular poker hand outcomes.

In a poker game context, the principles described herein may be applied in any type of poker game, including but not limited to stud poker variations, draw poker variations, community card poker variations, any combination thereof, or any other wagering game utilizing cards. In one embodiment, one or more cards of a hand(s) in a single or multiple hand game may result from a modified deck(s) of cards, and later hands may result from a further modified deck(s) of cards, and ultimately back to the original or default deck(s) of cards in some embodiments.

Numerous variations are possible in view of these and other embodiments of the inventive concept. Representative embodiments and variations are described herein, with some embodiments described with reference to the drawings. However, many other embodiments and variations exist that are covered by the principles and scope of this concept. For example, although some of the embodiments discussed below involve poker and/or video poker examples of this concept, other embodiments include application of these inventive techniques in other types of games such as slot games, poker games, roulette, bingo, or other games of chance. Some of these other types of embodiments will be discussed below as variations to the examples illustrated. However, many other types of games can implement similar techniques and fall within the scope of this disclosed concept.

Referring to the example gaming apparatus 100 shown in FIG. 1, the representative gaming apparatus includes at least a display area(s) 102 (also referred to as a gaming display), and a player interface area(s) 104, although some or all of the interactive mechanisms included in the user interface area 104 may be provided via other or additional means, such as graphical icons used with a touch screen in the display area 102 in some embodiments. The display area 102 may include one or more game displays 106 (also referred to as “displays” or “gaming displays”) that may be included in physically separate displays or as portions of a common large display. Here, the representative game display 106 includes at least a primary game play portion 108 that displays game elements and symbols 110, and an operations portion 109 that can include meters, various game buttons and other input mechanisms, and/or other game information for a player of the gaming device 100.

The user interface 104 allows the user to control, engage in play of, and otherwise interact with the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, touchscreen input, tactile input, and/or any other user input system or mechanism that allows the user to play and interact with the particular gaming activity.

The user interface 104 may allow the user or player to enter coins, bills, or otherwise obtain credits through vouchers, tokens, credit cards, tickets, electronic money, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player information, such as player loyalty information to identify a user or player of the gaming device. This mechanism may be, for example, a card reader, biometric scanner, keypad, or other input device. It is through a user interface such as the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touchscreen, entering text, entering voice commands, or other known data entry methodology.

The game display 106 in the display area 102 may include one or more of an electronic display, a video display, a mechanical display, and fixed display information, such as pay table information associated with a glass/plastic panel(s) on the gaming machine 100 and/or graphical images. The symbols or other indicia associated with the play of the game may be presented on an electronic display device or on mechanical devices associated with a mechanical display. Generally, in some embodiments, the display 106 devotes the largest portion of viewable area to the primary gaming portion 108. The primary gaming portion 108 may provide visual feedback to the user for any selected game. The primary gaming portion 108 may render graphical objects such as cards, slot reels, dice, animated characters, and any other gaming visual known in the art. The primary gaming portion 108 may also inform players of the outcome of any particular event, including whether the event resulted in a win or loss.

In some embodiments described herein, the primary gaming portion 108 may display a grid(s) or equivalent arrangement(s) of playing cards 110 forming one or more hands or other sets of cards in a card game, such as a poker game. In the illustrated example, a set of five playing cards 110 forms a video poker hand, which represents a portion of a game play event. For example, if the game play event is a video draw poker game, the gaming device 100 may deal five cards, allow the user to select cards to hold, deal replacements for the cards not held, and determine a payout based on the final cards in the hand. The illustration and description of five-card draw poker is for purposes of example and not of limitation, as the disclosure is applicable to numerous other card games, such as stud poker or hold'em poker, as well as other types of gaming activities and apparatuses, such as slot machines, dice, coins, etc. For example, some embodiments may relate to slot games, where the primary gaming portion 108 presents a grid (or equivalent arrangement) of symbols or other game elements in respective symbol locations (not shown), where the symbols or combinations of symbols determine gaming outcomes.

In some embodiments, the primary gaming portion 108 may also display one or more additional hands 112 of playing cards, such as in a multi-play poker embodiment. For example, one multi-play poker embodiment involves draw poker, where at least one hand 110 is dealt, and cards held by the player in hand 110 are replicated into one or more other hands 112, whereby all hands 110, 112 may then be completed with replacement cards while having one or more commonly held cards. Multi-play embodiments may also be played without holding any cards, and/or without replication of held cards into other hands. In some embodiments, other hands 112 may represent discrete, individually-played additional hands of cards that are unrelated to the play of other hands 110.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual cards to hold and/or selection of individual cards to discard and replace (e.g., in a draw poker embodiment), which subset of cards of a larger set of cards to hold/use for a final hand(s) (e.g., in some stud poker embodiments), wagering inputs, etc. The game display 106 of the display area 102 may include other features that are not shown, such as pay tables, navigation controls, etc.

Figure 2:
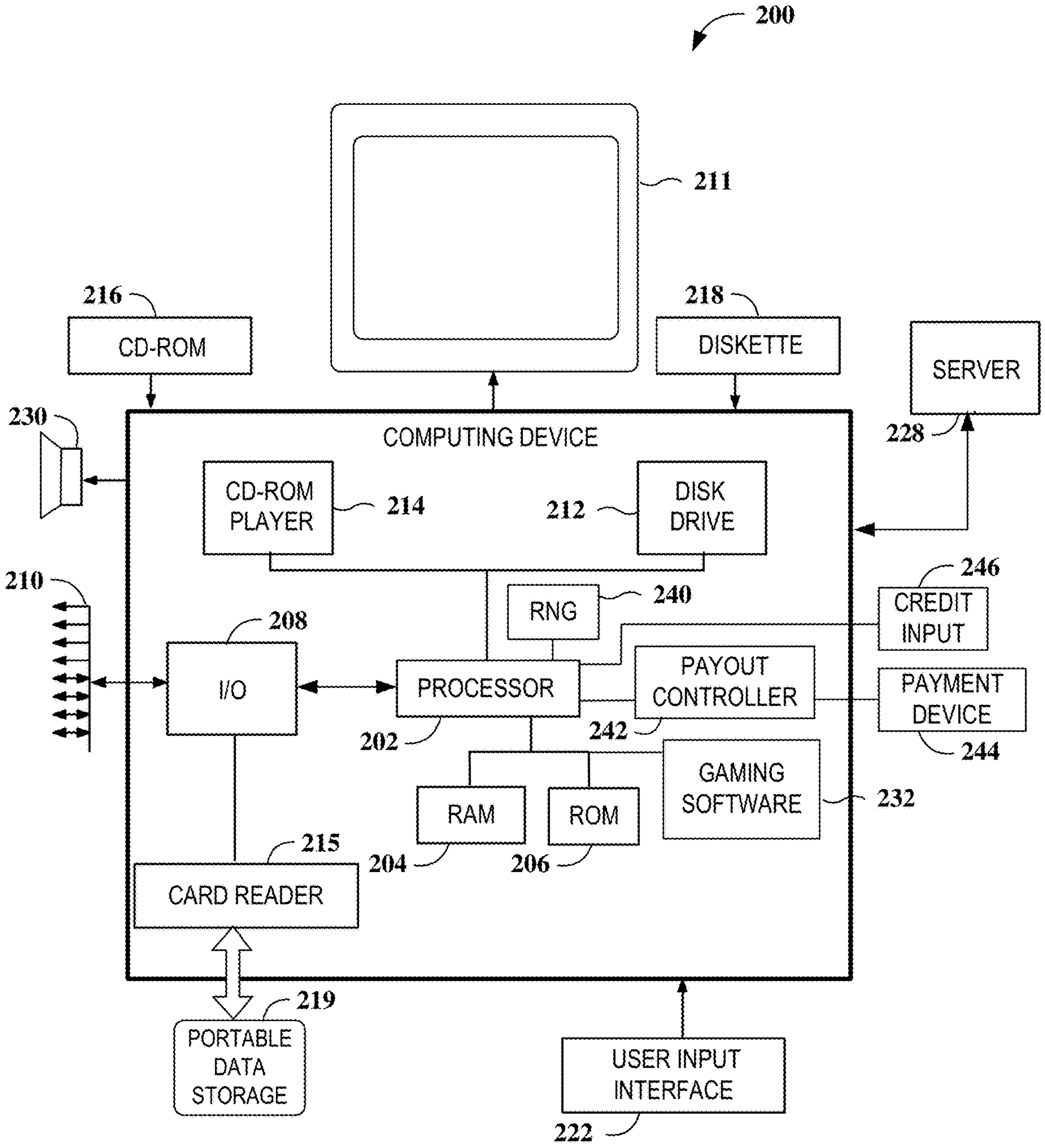
FIG. 2 is a block diagram illustrating a representative computing arrangement capable of implementing games and features in accordance with the invention and representative embodiments described herein.

Although FIG. 1 illustrates a particular implementation of some of the embodiments in a casino or electronic gaming machine ("EGM"), one or more devices may be programmed to play various embodiments of the disclosure. The concepts and embodiments described herein may be implemented, as shown in FIG. 1, as an electronic/video gaming machine or other special purpose gaming kiosk, or may be implemented via computing systems operating under the direction of local gaming software, and/or remotely-provided software such as provided by an application service provider (ASP). Such gaming machines may also utilize computing systems to control and manage the gaming activity, although these computing systems typically include specialized components and/or functionality to operate the particular elements of electronic gaming machines. Additionally, computing systems operating over networks, such as the Internet, may also include specialized components and/or functionality to operate elements particular to these systems, such as random number generators. An example of a representative computing system capable of carrying out operations in accordance with the principles described herein is illustrated in FIG. 2.

Hardware, firmware, software or any combination thereof may be used to perform the various gaming functions, display presentations and operations described herein. The functional modules used in connection with the disclosure may reside in a gaming machine as described, or may alternatively reside on a stand-alone or networked computer. The representative computing structure 200 of FIG. 2 is an example of a computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions described herein includes a processor(s), such as depicted by the representative central processing unit (CPU) 202, coupled to memory, such as random access memory (RAM) 204, and some variation of read-only memory (ROM) 206 or other persistent storage. The ROM 206 may also represent other types of storage media to store programs, such as programmable ROM (PROM), erasable PROM (EPROM or any technology capable of storing data). The processor 202 may communicate with other internal and external components through input/output (I/O) circuitry 208 and bussing 210, to communicate control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to one or more displays 211, which represent a manner in which the gaming activities may be presented. The display 211 represents the "presentation" of the game information in accordance with the disclosure, and may be a mechanical display, or an electronic/video display such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, inputting data to identify a player for a player loyalty system, etc. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG) or other random generator. The fixed and dynamic symbols generated as part of a gaming activity may be produced using one or more RNGs. RNGs may be implemented using hardware, software operable in connection with the processor 202, or some combination of hardware and software. The principles described herein are operable using any known RNG, and may be integrally programmed as part of the processor 202 operation, or alternatively may be a separate RNG controller 240 that may be associated with the computing arrangement 200 or otherwise accessible such as via a network. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server(s) 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 or other processor(s) indicating a payout is to made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout or payment device 244 may also be provided in gaming machine embodiments, where the payment device 244 serves as the mechanism providing the payout to the player or participant. In some embodiments, the payment device 244 may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency or asset. In yet other embodiments, the payout device 244 may send a signal via the network server 228 or other device to electronically provide a credit amount to an account associated with the player, such as a credit card account or player loyalty account. The computing arrangement 200 may also include accounting data stored in, for example, one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, or any other player assets, for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payment device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described herein. For example, the software 232 may present, by way of the display 211, representations of symbols to map or otherwise display as part of a slot based game having reels. However, in other embodiments, the principles of this concept may be applied to poker games or other types of games of chance. One or more aligned positions of these game elements may be evaluated to determine awards based on a pay table. The software 232 may include instructions to provide other functionality as known in the art or as described and shown herein.

The systems, apparatuses and methods operable via these and analogous computing and gaming devices can support gaming features as described herein. In one embodiment, processor-based software modules may be configured to dynamically modify sources of game play items during play of the gaming activity. For example, processor-based software modules may be configured to change the deck(s) of cards that sources single-hand or multiple-hand video poker games, where such deck modification may apply for a single hand or a plurality of hands, whether on a current deal or a succession of hand deals (e.g., a succession of wagered single-hand or multiple-hand poker events).

Many embodiments may be described in terms of an electronic poker game, where presented cards potentially form a result(s) that conforms to a predetermined winning outcome to determine payout awards. However, the principles described herein are equally applicable to other games of chance, as described herein and as will be readily apparent to those skilled in the art from the teachings herein.

Figure 3A:
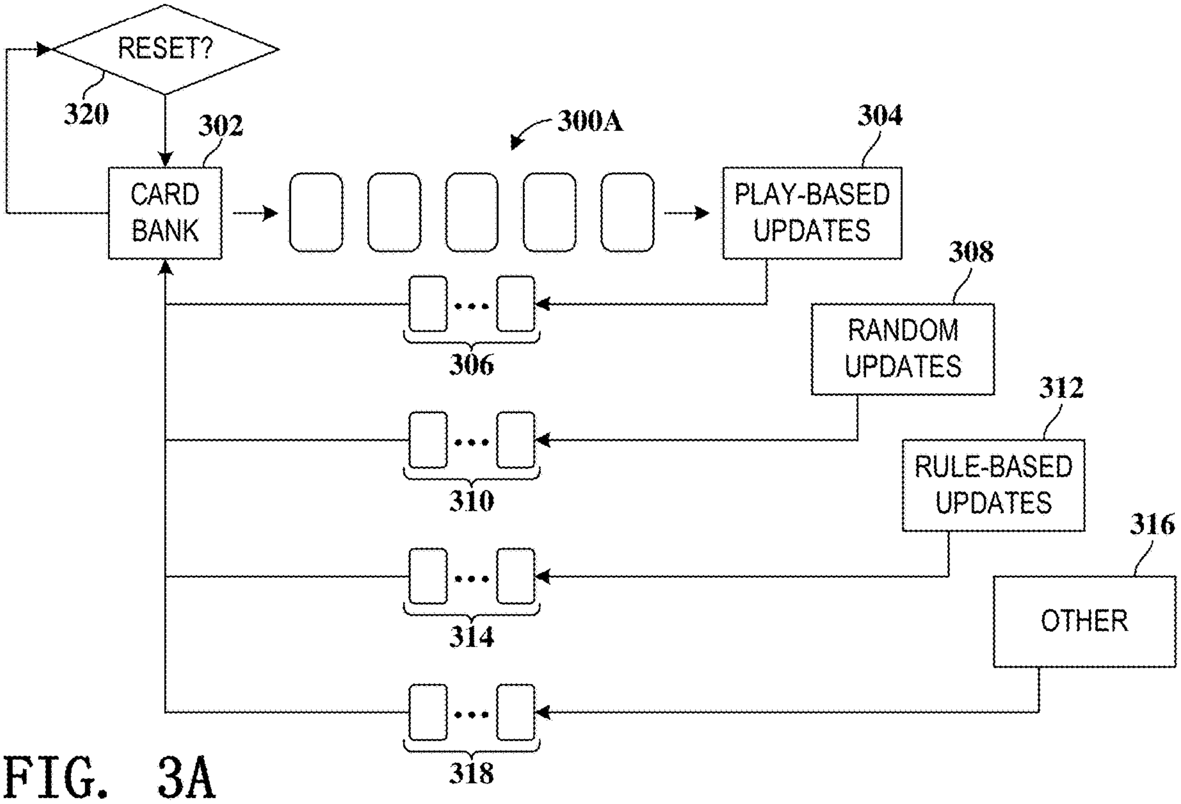
FIGS. 3A and 3B depict representative manners for dynamically modifying the deck(s) of cards that sources the playable poker hands of the game.
Figure 3B:
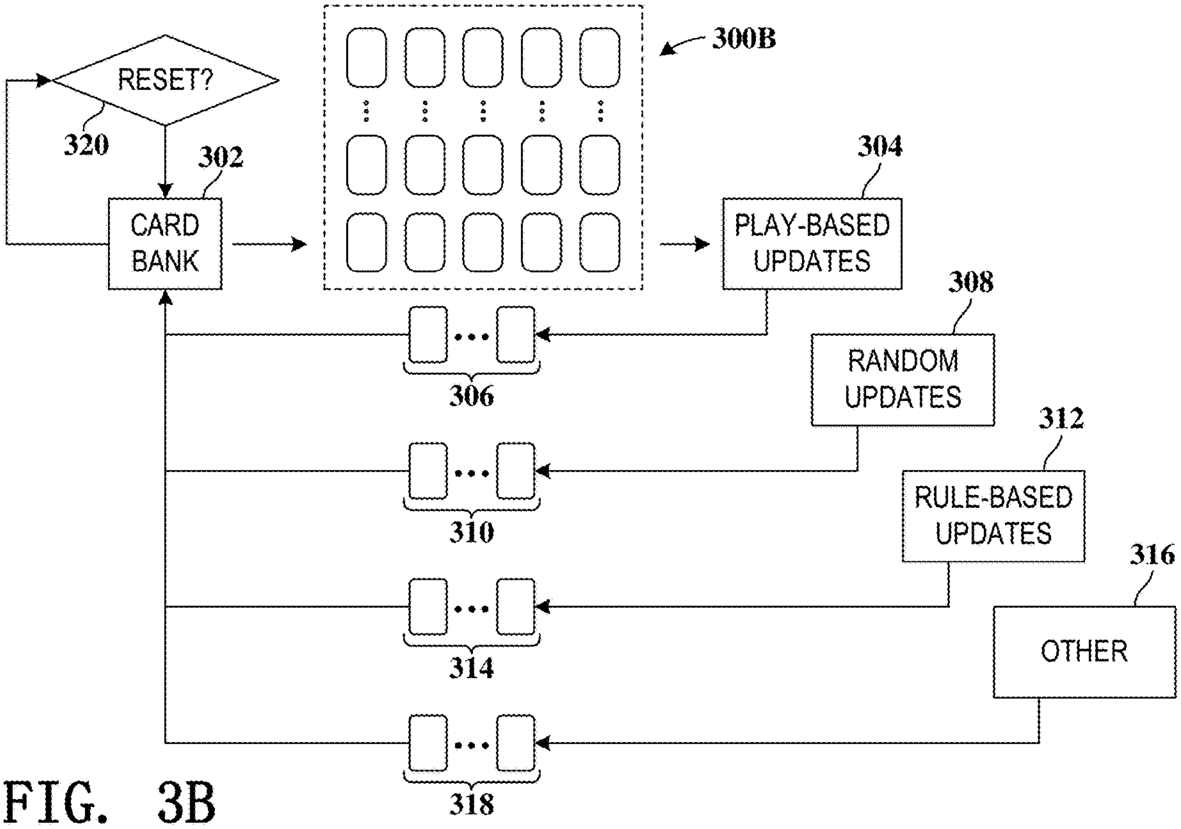

FIGS. 3A and 3B are described in the context of an electronic poker game, and depict representative manners for dynamically modifying the deck(s) of cards that sources the playable poker hands of the game. The example of FIG. 3A includes a single hand of poker 300A. FIG. 3B illustrates another representative example, involving a multi-play draw poker format, such as where an initial hand is dealt, and cards held in the initial hand are replicated into other hands, whereby non-held and non-replicated cards are then drawn to form multiple final hands. Like reference numbers for FIGS. 3A and 3B are employed where appropriate, and the description herein applies to both FIGS. 3A and 3B except where otherwise noted. Thus, unless otherwise noted, descriptions associated with one of FIG. 3A or FIG. 3B are applicable to the other of FIG. 3A and FIG. 3B.

The card bank 302 serves as the source of cards for the poker hand 300A/300B, where the card bank 302 is a standard deck of cards in one embodiment. Updates to the card bank 302 may be made in accordance with the present disclosure, as various representative examples below indicate.

In one embodiment, updates to the card bank 302 occur as a result of play-based updates 304. Play-based updates 304 indicates that cards involved in participating in the poker game may serve as the basis for identifying card modifications 306 to modify the card bank 302. Play-based updates 304 may include, for example, all cards from winning hands in a current game are added as card modifications 306 to the card bank 302. In a single-hand version such as that of FIG. 3A, if the hand 300A results in a winning hand, those five cards would serve as the card modifications 306 to update the card bank 302. In a multi-hand version such as that of FIG. 3B, for any of the hands of the multiple hands 300B that provide winning results, those associated cards serve as the card modifications 306 to the card bank 302. Another example of a play-based update 304 is all face cards presented via the played hand(s) 300A, 300B, which could be added to the card bank 302. Another example of a play-based update 304 is all cards less than some number, such as less than 9's in the deck, that are associated with play of hands 300A or 300B are removed from the card bank 302.

Updates to the card bank 302 may alternatively or additionally occur as a result of random updates 308. For example, one or more cards may be randomly added, or removed, to serve as the card modifications 310 to the card bank 302. Such random updates 308 may occur at random times, or in connection with other happenings in the poker game, etc.

Updates to the card bank 302 may alternatively or additionally occur as a result of rule-based updates. For example, one or more cards may be added if a sub-symbol is associated with a card(s) being played via the hand 300A or 300B, where a rule indicates that the card value associated with such sub-symbol will serve as the card modifications 314 to the card bank 302. Another representative rule-based update 312 is to enable a player to pick a card or group of cards, and those cards serve as the card modifications 314 that are removed or added to the card bank 302. Other 316 manners of identifying a card or group of cards to serve as card modifications 318 may instead or additionally be implemented.

Betting structure may be done as desired, whereby the cost to participate in the game modification features (e.g., poker deck modification features) described herein may be built into the normal cost per hand or per game, or may involve an additional single wager, or may involve an additional wager per hand played, etc. In one example, a wager to play a poker hand may be five credits, and an additional one credit is paid to participate in the game modification features described herein, or an additional one credit per hand may be involved to participate in the game modification features. In other embodiments, the player may purchase cards, card positions, special decks, and/or other manners of enabling dynamic game play item modification. Any credit structure desired to accommodate the math to provide payouts at the desired rate may be employed.

For example, in one representative example, a single hand of video poker may involve a player bet of five credits for the hand play, and five credits for participation in a card deck modification feature. Based on some triggering event, or randomly, or otherwise, a change to the poker hand(s) sourcing deck(s) occurs for the present and/or future hands of poker. A representative betting structure of, for example, a 5+5 structure for a total of thirty credits (e.g., five credits to play each of the three hands, plus five credits to be eligible for the card enhancement feature for each of the three hands). In one embodiment, the triggering event may cause any royal flush cards on the display, e.g., those associated with the currently-played poker hand(s), are added to the deck for one or more subsequent plays. In other embodiments, rather than royal flush cards being added, Aces displayed in connection with the currently-played poker hand(s) are added to the deck for one or more subsequent plays. Numerous other representative examples of what may be added to the deck are described elsewhere herein, although any desired cards, or cards with certain characteristics, or random cards, or otherwise may serve as the card(s) to be added to the sourcing deck(s).

The modified poker deck(s) may be reset to its initial, default state in response to some event, such as a number of poker hands and/or poker events played using the modified deck, an expiration of time, a triggering event such as a particular card(s) being dealt or drawn in connection with a game, etc. One embodiment involves using a modified deck for some number of future poker events (e.g., a single-hand or multi-hand poker game), such as resetting to the deck's initial state (e.g., a normal, 52-card deck) after the player has participated in ten poker events using the modified deck. Any number may be used. In some embodiments, the resetting may not be reset to its initial state, but instead may remove deck modifications iteratively, such as removing one added card at a time until the deck is at its default state. In other embodiments, the deck may simply continue to be modified, and never reach its initial state unless by coincidence, resulting in a perpetually-modified sourcing deck(s). These and other manners of modifying the deck and returning the deck to another state may be implemented as those skilled in the art will readily recognize in view of the teachings provided herein.

In some embodiments, instead of adding to the deck or removing from the deck, the deck could remain at its default count (e.g., 52 cards), but when dealing cards, cards on a list or otherwise identified may be skipped over. Therefore, when referring to a "modified" deck 516, this also includes embodiments where dealing irregularities or other deck manipulations are intentionally involved, to mimic a change to the deck(s) at play. Therefore, references to a "modified" deck or analogous language is not intended to, nor does it, limit the concepts herein to modifications specifically to the number or types of cards in the deck(s), but rather refers to providing any manner of deviating from the standard weighting otherwise provided by the card deck or other source of game play items.

Figure 4:
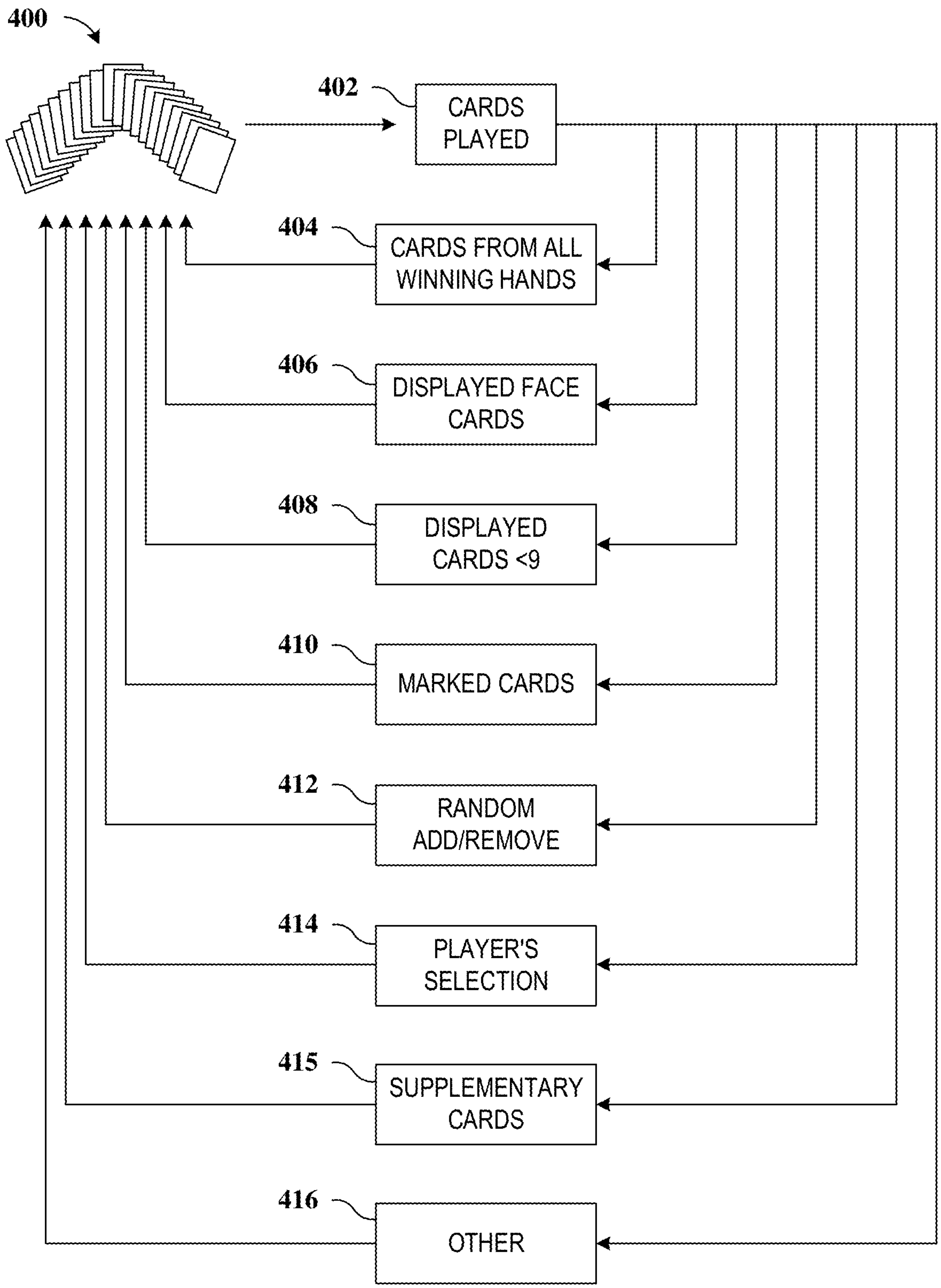
FIG. 4 depicts representative examples of play-based updates that may be derived from player participation in the poker game.

FIG. 4 depicts representative examples of play-based updates that may be derived from player participation in the poker game. The examples of FIG. 4 are provided as representative examples, and do not represent an exhaustive list of all play-based updates that may be used in connection with the present disclosure. In this example, a deck 400 of cards serves as the source of cards for the poker game(s) being played. From that deck 400 of cards, some of those cards are played 402 in connection with a single-hand poker event or multi-hand poker event. In a first representative embodiment, cards from all winning hands 404 are added to the deck 400. These cards may include any standard cards of the deck, Wild cards, Jokers, etc. In another representative embodiment, displayed face cards 406 from a current poker game (any one or more hands associated therewith) are added to the deck 400, whether or not those face cards are involved in a winning result.

In other embodiments, the cards from all winning hands 404 to be added to the deck 400 are those that are involved in winning outcomes. In another representative embodiment, cards within some range, or above some range, or below some range are added or removed to the deck 400. For example, all cards displayed 408 of the cards played 402 that are less than nine may serve as the card modifications, such as being removed from the deck 400. This would cause the deck 402 weighted more heavily with higher cards, such as face cards, which may provide winning outcomes more often (e.g., where a pair of Jacks or better is a winning outcome).

In another representative embodiment, cards that are in some way marked 410 may serve as the card modifications to the deck 400. For example, cards that are marked with a sub-symbol, cards that are highlighted, and/or cards that are otherwise distinctly presented among the cards played 402 may serve as the card modifications to the deck 400. Such identified cards may, based on the rules of the game, be added or removed from the deck 400. Cards that may be marked may be defined as any cards from a standard deck; may be restricted to some subset of cards (e.g. face cards, Aces, Royal Flush cards, etc.); may include Wild cards, Jokers, and/or other non-standard cards; or the like.

In another representative embodiment, a card or group of cards may be randomly added and/or removed 412 as desired, to serve as the card modifications to the deck 400. For example, an indication may arise, or one or more cards may be randomly highlighted, to identify the card(s) two serve as the card modifiers to the deck 400. Cards that may be randomly added and/or removed 412 may include any cards from a standard deck; may be restricted to some subset of cards (e.g. face cards, Aces, Royal Flush cards, etc.); may include Wild cards, Jokers, and/or other non-standard cards; or the like.

In another representative embodiment, the player is allowed to select 414 one or more cards to be added or removed from the deck 400, where such cards could be added or removed to the deck 400 over time, or in connection with other events. For example, the player may be allowed to select his/her favorite cards suit, whereby one, or up to all 13 cards of that suit may be duplicated in the deck 400 (e.g., to provide a greater chance at a flush, for example).

In another embodiment, the deck may be enriched with one or more supplementary cards that may be provided in any manner, such as cards from all winning hands 404, marked cards 410, random added/removed 412 cards, player's selection 414, etc. Such supplementary cards may include, for example, Wild cards, Jokers (having some predefined or dynamically defined value), and/or other non-standard cards that differ from the standard 52 cards in a deck of poker cards. For example, Wild cards may be added to the deck 400 to create/update a modified sourcing deck of cards. In other embodiments, Wild cards may replace one or more cards of the deck 400 to create/update a modified sourcing deck of cards. By adding Wild cards and/or converting existing cards to Wild cards in the deck, thereby creating an enriched modified deck, the probability of being dealt cards that produce a winning result and/or payout, or a better winning result and/or better payout, is enhanced. Other 416 manners of identifying cards to add and/or remove from the deck 400 may analogously be employed.

These representative examples, and other analogous modifications to the deck 400, may provide a rich deck that, in some embodiments, may provide the player with heightened probabilities of obtaining winning outcomes and/or payouts.

Figure 5:
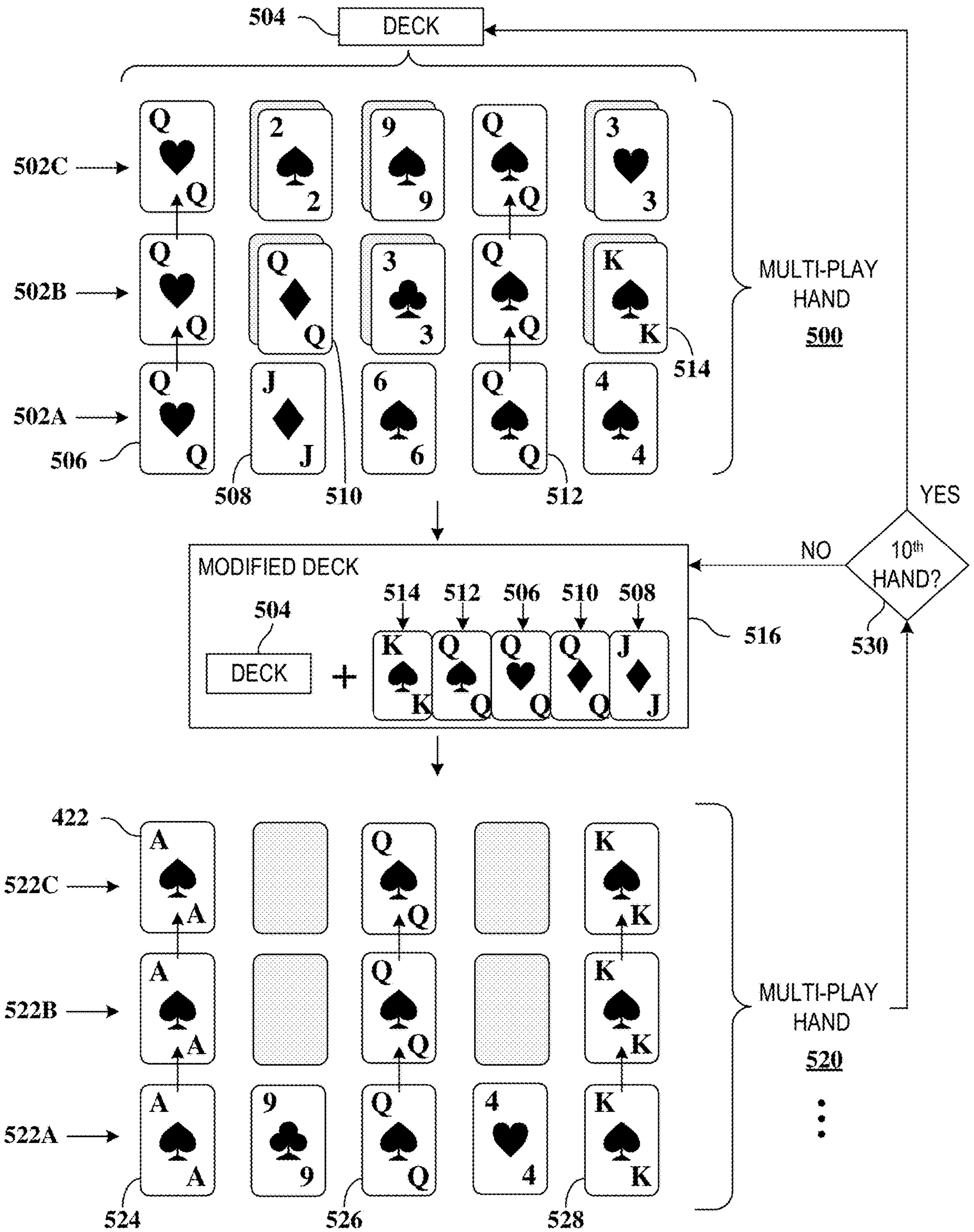
FIG. 5 depicts a representative example of a representative multi-hand draw poker game employing the card deck modification features described herein.

FIG. 5 depicts a representative example of a representative multi-hand draw poker game employing the card deck modification features described herein. A first multi-play hand 500 is played, which includes an initial deal of a hand 502A, and two more (in this example) hands 502B, 502C. In one embodiment, cards held in the initial hand 502A are replicated into corresponding card positions of other hands 502B, 502C (although the cards could be replicated into any of the card positions of the other hands 502B, 502C). After cards are drawn into the non-held card positions, final hands result for each of the hands 502A, 502B, 502C, which is the state depicted on multi-play hand 500.

In this example, a deck 504 of cards serves as the source of cards for the multi-play hand 500. Any of the deck update methodologies described herein, or other deck update methodologies desired for modifying the deck 504, may be used to provide a modified deck 516 for one or more subsequent hands 520. In the embodiment of FIG. 5, the deck update methodology utilized is to provide a modified deck 516 by adding cards from the multi-play hand 500 that could be used in a Royal Flush to the deck 504. Thus, in the first multi-play hand 500, the player obtained numerous cards that are used in Royal Flushes, including the Queen of Hearts 506, Jack of Diamonds 508, Queen of Diamonds 510, Queen of Spades 512, and King of Spades 514. In one embodiment, regardless of the outcome of any of the hands 502A, 502B, 502C, those cards 506, 508, 510, 512, 514 are added to the deck 504 to arrive at a modified deck 516 for use in one or more subsequent multi-play hands 520.

Thus, when playing the next one or more multi-play hands 520, the source of the cards used is the modified deck 516. In this example, the modified deck 516 includes additional cards 506-514, which could increase a player's chances of obtaining a royal flush (among other things, such as face card pairs, etc.) in the one or more subsequent multi-play hands 520. As seen from the subsequent multi-play hand 520, the initial hand 522A includes the Ace of Spades 524, Queen of Spades 526, and King of Spades 528, all of which could lead to a Royal Flush. While it may not be known whether either of the Queen of Spades 512 or King of Spades 514 added to the deck 504 to arrive at the modified deck 516 were a direct result of the Queen of Spades 526 or King of Spades 528 being presented in the initial hand 522A, it is at least known that the probability of receiving those cards was increased. In the illustrated embodiment, the player has opted to hold the Ace of Spades 524, Queen of Spades 526, and King of Spades 528 into the other hands 522B, 522C, thereby increasing the chances of obtaining a Royal Flush (among other outcomes involving such cards) when replacement cards are provided for the non-held cards.

Various embodiments involve using the modified deck 516 for different numbers of subsequent hands 520, whether based on time, number of hands played, etc. In the illustrated embodiment, the criteria for modified deck 516 use is assumed to be a fixed number of played hands 520, such as ten hands. Thus, if the number of multi-play hands 520 has not reached ten such hands as determined at decision block 530, the modified deck 516 continues to be used for those subsequent multi-play hands 520. Otherwise, if it is determined 530 that the number of multi-play hands 520 has reached ten, the deck 504 is reset to its original state in this embodiment.

In some embodiments, once the feature is triggered for use, the deck may be modified in connection with the hand being played, and is not further modified until the termination condition is met, at which time the deck may again be modified. Using FIG. 5 as an example of such an embodiment, the inclusion of cards 506, 508, 510, 512 and 514 to the modified deck 516 may occur in connection with a hand, such as multi-play hand 500, where the modified deck 516 remains in that same modified state for the duration of the ten hands (or other modified deck termination or reset criteria). In such a case, each of the multi-play hands 520 and beyond will use the modified deck 516 as it was originally modified based on one of the hands (e.g. hand 500).

In other embodiments, the modified deck 516 may be modified on each subsequently-played hand if criteria is met to add another card(s) to the modified deck to provide updates as the poker games are played. For example, criteria may be whether certain cards arise in the subsequently-played hands, such as adding more cards from the multi-play hand 520 to the modified deck 516 if the multi-play hand 520 exhibits further cards towards, for example, a Royal Flush (in a single card suit or any card suit in various embodiments) or other poker hand result. Other criteria may be whether a sub-symbol or other indicator arises to indicate that an associated card(s) or otherwise identified card(s) may be added to the modified deck 516, or other criteria defined to enable cards to be added to the modified deck.

In other embodiments, cards added to the modified deck 516 in connection with one hand (e.g. multi-play hand 500) may iteratively or otherwise partially move back towards a reset deck 504 as further hands (e.g. hand 520 and beyond)

are played. For example, in one embodiment, once the cards 506, 508, 510, 512 and 514 are added to the deck 504 to result in the modified deck 516, one of those cards 506, 508, 510, 512 and 514 may be removed from the modified deck 516 on each subsequently played hand (e.g. hand 520 and beyond), or every other subsequently played hand, or randomly as the subsequent hands are played, etc. As this occurs, in one embodiment, cards may still be added to the modified deck from other hands played. For example, in connection with playing hand 500, the deck 504 may be modified 516 to include the identified cards 506, 508, 510, 512 and 514. Then, in one embodiment where those cards are removed as subsequent hands are played, a card such as card 514 may be removed from the modified deck 516, leaving only four additional cards 506, 508, 510, 512 for the next subsequently played hand(s), while on such subsequently played hand(s) another card (not shown) may be added to the modified deck 516. Therefore, as poker games are played, one embodiment involves adding cards to the modified deck 516 and removing them during play of one or more subsequent poker games, while adding other cards (which may be the same or different than those added/removed from prior hands, based on the particular embodiment) to the modified deck 516 and removing them during still further play of subsequent games may occur in parallel in an overlapping manner. As a more particular example, one embodiment may involve adding cards to the modified deck 516 when sub-symbols or other indicia associated with cards during play of the poker games progresses, and each card added to the modified deck 516 remains for some number of poker games played, or for some time, or until some condition is met, or the like.

Figure 6:
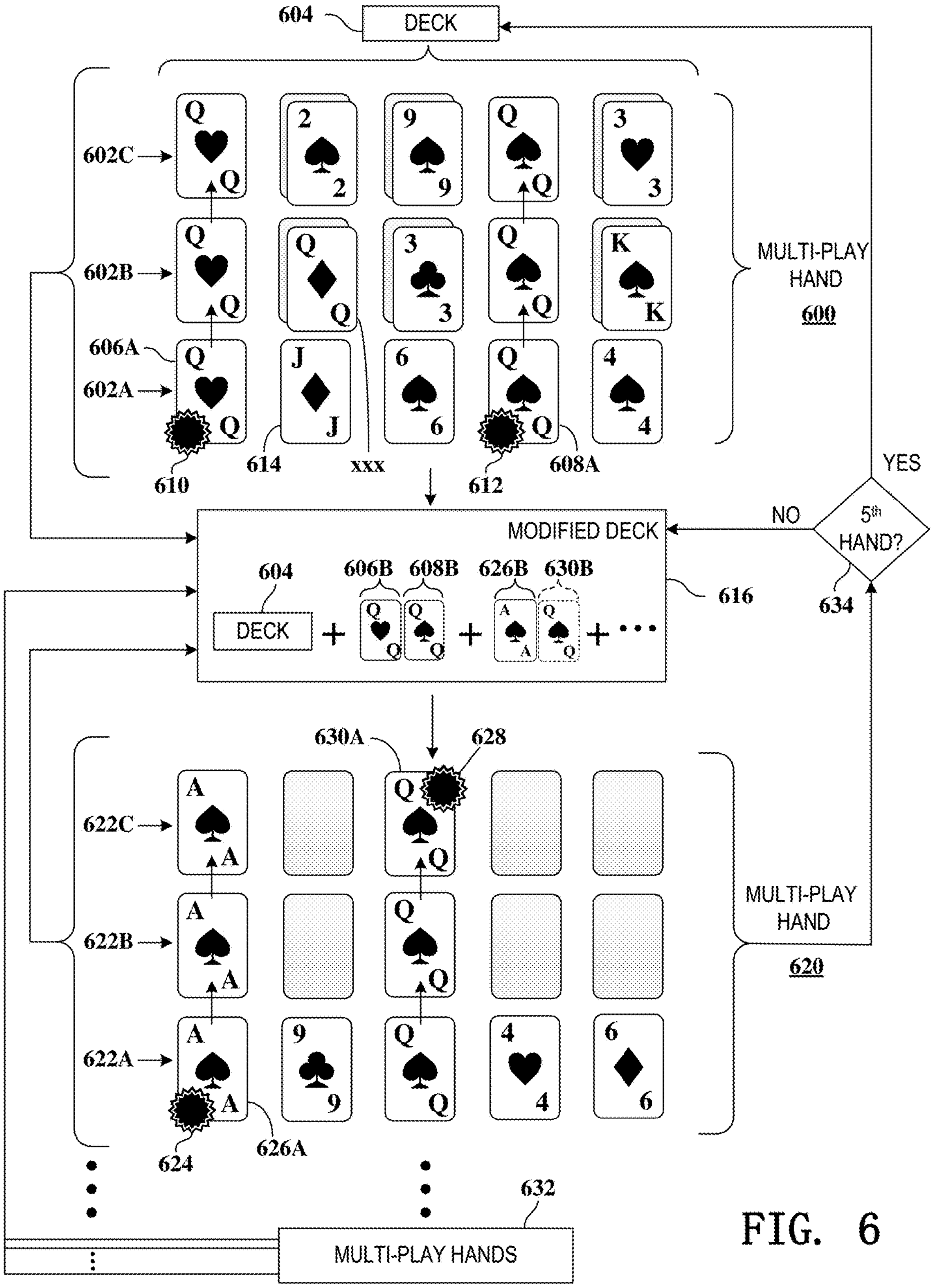
FIG. 6 depicts an embodiment where the modified deck may continue to be updated as the player plays further poker games/hands.

FIG. 6 depicts an embodiment where the modified deck may continue to be updated as the player plays further poker games/hands. In this representative example, a first multi-play hand 600 is played, which includes an initial deal of a hand 602A, and in this example two more hands 602B, 602C. While the description is equally applicable to single-hand poker games, the example of FIG. 6 assumes a multi-hand embodiment, and in the illustrated embodiment a multi-play embodiment where cards held in the initial hand 602A are replicated into the other hands 602B, 602C. After cards are drawn into the non-held card positions (for draw poker embodiments), final hands result for each of the hands 602A, 602B, 602C, which is the state depicted on multi-play hand 600.

In this example, the deck(s) 604 of cards serves as the source of cards for the multi-play hand 600. Any of the deck update methodologies described herein, or other deck update methodologies desired for modifying the deck 604, may be used to provide a modified deck 616 for one or more subsequent hands 620. In the embodiment of FIG. 6, the deck update methodology utilized is to provide a modified deck 616 by first adding cards from the multi-play hand 600 that have sub-symbols therewith, such as card 606A (Queen of Hearts) and card 608A (Queen of Spades) which have sub-symbols 610, 612 respectively associated therewith. As previously noted, other embodiments may be used to identify cards other than the use of sub-symbols, and the sub-symbol example of FIG. 6 is for purposes of illustration without limitation to such embodiment. For example, other embodiments may identify cards to add to the modified deck 616 if they are face cards in the first hand 602A (which in this example would have also then included card 614 (Jack of Diamonds); or cards from the multi-play hand 600 that were involved in a winning outcome; or all face cards resulting from the multi-play hand 600, or mystery cards (e.g. randomly presented) into the modified deck 616; and/or any other desired criteria for including cards in the modified deck 616. However, in the illustrated embodiment, it is assumed that cards 606A, 608A associated with designating indicia (e.g. sub-symbols 610, 612) will be added to the modified deck 616, as depicted by the addition of cards 606B and 608B added to the deck 604 to represent the current modified deck 616.

In the embodiment of FIG. 6, play of subsequent hands may further add to the modified deck 616. Again using the example of sub-symbols designating cards for inclusion in the modified deck 616, play of the multi-play hand 620 (which may be the immediately succeeding hand to hand 620, or a still later hand) might also randomly provide another sub-symbol(s). Multi-play hand 620 includes three concurrently played hands 622A, 622B and 622C. In this example, a sub-symbol 624 has randomly appeared in connection with card 626A. Also, sub-symbol 628 has randomly appeared in connection with card 630A, whether appearing before card 630A had yet been dealt (e.g. the sub-symbol 628 occurred in connection with the card position where card 630A was eventually provided), or after card 630A had yet been dealt, or if card 630A was a replicated card or a drawn card, etc.

In this embodiment, the card(s) associated with a randomly-appearing sub-symbol(s) in connection with multi-play hand 620 will be added to the modified deck 616, assuming that any deck reset condition has not been activated and the poker game play is still operating in the modified deck 616 mode. Card 626A is therefore added to the modified deck 616 as seen by card 626B.

Card 630A was also marked with a sub-symbol 628. In one embodiment, the card 630A will not be added to the modified deck 616, as that card is already present in the modified deck 616 from a prior hand 600 (see Queen of Spaces 608B). In an alternative embodiment, the card 630A is added to the modified deck 616, as depicted by card 630B, even though that same card is already associated with the modified deck 616 by way of card 608B. In such a case, the modified deck 616 can have duplicates of cards, such as cards 608B and 630B (both Queens of Spades in this example).

Subsequent hand supplements to the modified deck 616 can continue until, for example, cards are removed from the modified deck 616, and/or reset to the deck 604 based on some termination condition (if any), etc. Various embodiments involve using the modified deck 616 for different numbers of subsequent hands 620, 632, whether based on time, number of hands played, etc. In the embodiment of FIG. 6, the assumed criteria for continued use of modified deck 616 is a fixed number of played hands, such as five hands. Thus, if the number of multi-play hands 620, 632 making use of the modified deck 616 has not reached five hands as determined at decision block 634, the modified deck 616 continues to be used for those subsequent multi-play hands 620, 632. Otherwise, if it is determined 634 that the number of multi-play hands 620, 632 has reached five, the sourcing deck 604 is reset to its original state in this embodiment.

In some embodiments, the poker hand sourcing deck 604 may not be reset to its original state upon expiration of the five hands (or occurrence of other criteria), but rather cards may be systematically or randomly removed from the modified deck 616 to move the modified deck 616 back towards the deck 604 reset state. As previously noted, during such time, some embodiments allow subsequent hands 620, 632 to continue to add cards to the modified deck 616, as expirations or other termination criteria removes other cards from the modified deck 616. In some embodiments, an expiration or termination condition (e.g. a fixed number of hands played, or time elapsed, etc.) may result in some cards being associated with the modified deck 616 longer than other cards might be associated with the modified deck 616, as cards would become part of the modified deck 616 at different times, yet be removed from the modified deck 616 when the termination condition is met. In still other embodiments, the termination condition applies to each card added to the modified deck 616 individually, such that each card added to the modified deck 616 will be available for five hands (using the count of five hands as an example, or other criteria in other embodiments).

Figure 7:
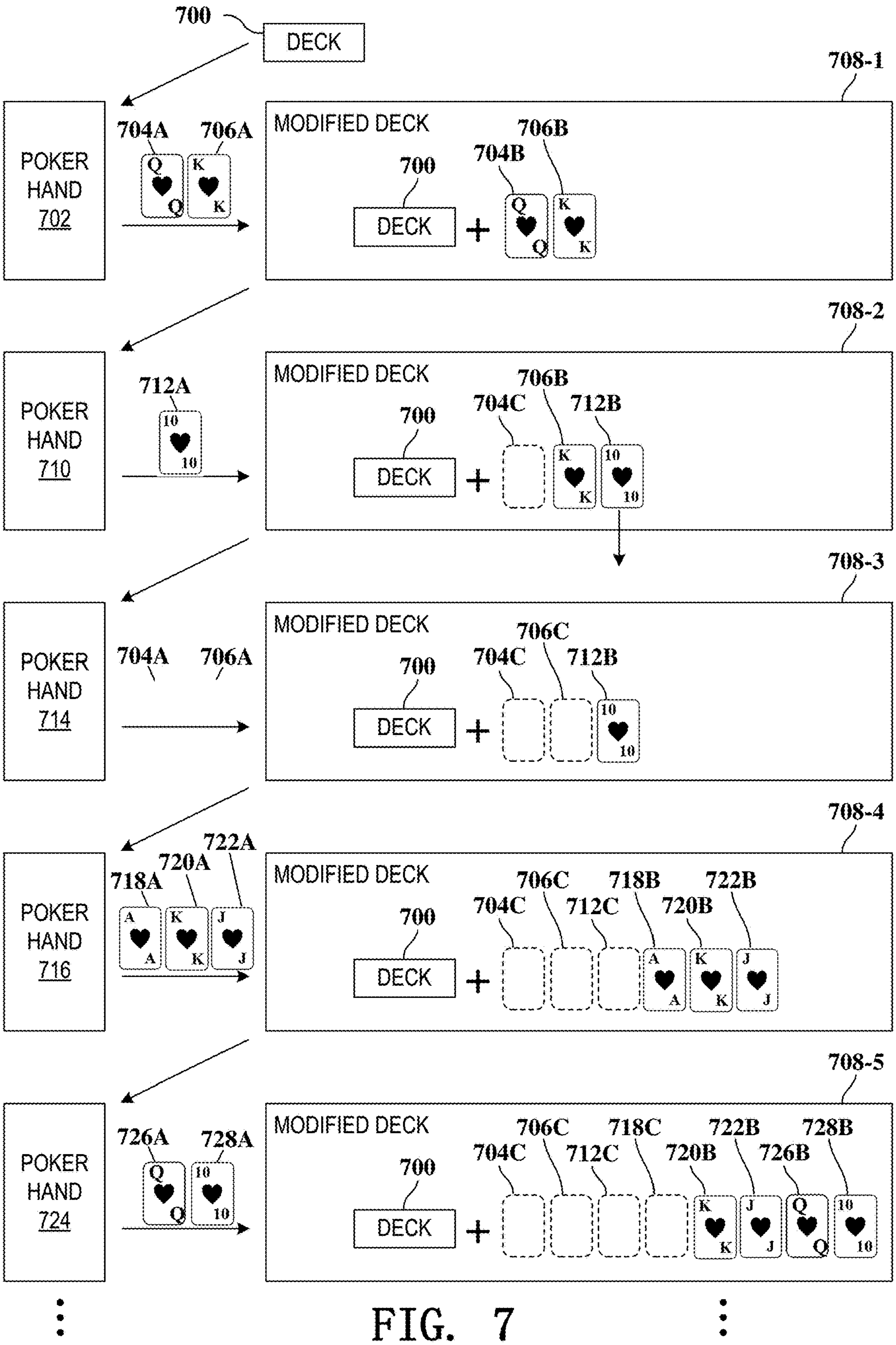
FIG. 7 is a diagram illustrating a representative manner in which a sourcing deck(s) of electronic cards may be dynamically modified, through card additions and removals, during play of a series of electronic poker games.

FIG. 7 is a diagram illustrating a representative manner in which a sourcing deck(s) of electronic cards may be dynamically modified, through card additions and removals, during play of a series of electronic poker games. A deck 700 represents an electronic (e.g. virtual) deck(s) of cards that provides the cards for a current poker hand 702 (which may involve single-hand poker, multi-hand poker, multi-play poker, stud poker, draw poker, or any other poker or card game where games/hands are able to be played in a consecutive manner).

This example makes various assumptions based on rules of this particular embodiment. It should be noted, however, that such principles are applicable to other embodiments involving different rules. For purposes of illustration, this embodiment assumes that cards occurring in a current poker hand that may contribute to a particular poker hand result(s) (a Royal Flush in Hearts in this example) will become part of a modified deck. Other embodiments could add to the modified deck all cards that contribute to a Royal Flush, regardless of the card suit. Or cards to be added to the modified deck could be those associated with a winning hand(s) in the current poker hand, or all face cards, or all cards with rank of nine or less are removed, etc.

Another assumption for this example is that one card will be removed from the modified decks on each played hand, such as one of the cards that has been associated with the modified deck the longest. This is merely one embodiment use in the example of FIG. 7, as many other embodiments are available. For example, another embodiment that could be used in a dynamically updated (adding and removing) modified deck would be that cards added to the modified decks will last for one additional hand played (or alternatively two, or three, or more additional hands played, or a random number of hands, or until a condition is met, etc.) and then would be removed from the modified deck. In any event, for purposes of this example, it is assumed that one of the cards being in the modified decks will be removed on each subsequent poker game play.

Thus, the description in FIG. 7 using particular assumptions should not be seen as limiting, but rather as a representative embodiment of how a deck 700 may be dynamically modified during continued play of poker games.

In connection with play of the poker hand 702, two cards 704A, 706A appeared or were otherwise marked for inclusion in the modified deck 708-1, as depicted by cards 704B, 706B in the modified deck 708-1. Thus, the modified deck 708-1 is used for the next poker hand 710, and includes two additional cards (Queen of Hearts and King of Hearts) towards a Royal Flush in Hearts.

In connection with play of the poker hand 710, one card 712A appeared or was otherwise marked for inclusion in the modified deck 708-2, as depicted by card 712B in the modified deck 708-2. However, this example assumes that one of the added cards (if any) of the modified deck that has been associated with the modified deck the longest will be removed on each subsequently played hand. Therefore, since cards 704B, 706B were both associated with the modified deck 708-1, one of those cards will be removed in this embodiment. Determining which of the "oldest" cards to remove may be accomplished in any manner, such as randomly selecting one, removing the card with the lowest or highest poker rank, etc. In this example, the Queen of Hearts card 704B from the modified deck 708-1 has been removed for modified deck 708-2, as seen by removed/blank card position 704C. Thus, modified deck 708-2 has gained a card 712B, but lost a card as depicted by card position 704C. In its current state, the modified deck 708-2 thereby includes two additional cards (King of Hearts and Ten of Hearts) towards a Royal Flush in Hearts.

In connection with play of the poker hand 714, no cards appeared or was otherwise marked for inclusion in the modified deck 708-3, so no cards are added to the modified deck 708-3. However, this example assumes that one of the added cards (if any) of the modified deck that has been associated with the modified deck the longest will be removed on each subsequently played hand. Since card 706B (King of Hearts) was associated with the modified deck 708-1, it is the oldest card added to the modified deck, and is therefore removed as seen by removed/blank card position 706C. Modified deck 708-3 has therefore gained no cards, but lost a card as depicted by card position 704C. In its current state, the modified deck 708-3 thereby includes one additional card (Ten of Hearts) towards a Royal Flush in Hearts.

In connection with play of the poker hand 716, three cards 718A, 720A, 722A appeared or were otherwise marked for inclusion in the modified deck 708-4, as depicted by cards 718B, 720B and 722B in the modified deck 708-4. Since card 712B is the oldest having been provided by poker hand 710, it is removed as depicted by the removed/blank card position 712C. Thus, modified deck 708-4 has gained three cards 718B, 720B, 722B, but lost a card as depicted by card position 712C. In its current state, the modified deck 708-4 thereby includes three additional cards (Ace of Hearts, King of Hearts, Jack of Hearts) towards a Royal Flush in Hearts.

In connection with play of the poker hand 724, two cards 726A, 728A appeared or were otherwise marked for inclusion in the modified deck 708-5, as depicted by cards 726B and 728B in the modified deck 708-5. Since card 718B (among others) is one of the oldest having been provided by poker hand 716, it is removed as depicted by the removed/blank card position 718C. Again, which card of the oldest to be removed may be randomly determined, based on card characteristics, based on whether other like cards have been added to the modified deck, etc. Thus, modified deck 708-5 has gained two cards 726B, 728B, but lost a card as depicted by card position 718C. In its current state, the modified deck 708-5 thereby includes four additional cards towards a Royal Flush in Hearts.

This card inclusion and removal from the modified deck may continue indefinitely. In other embodiments, this continual adaptation of the modified deck may be discontinued based on some event such as, for example, a fixed number of hands has been played; a random termination occurred thereby resetting the deck 700; a random or fixed time elapsed; player reduced wager input; player cashed out; and/or any other criteria desired.

Some embodiments involve resetting the modified deck to its original state, e.g. deck 700, when some triggering event occurs. This type of a reset may be applied in embodiments that involve a continual adaptation of the modified deck(s), as well as in embodiments where the modified deck is set or otherwise established and maintained in that state over a plurality of subsequently played poker games, as well as in other embodiments.

As previously noted, instead of adding or removing cards from the deck, other manners of reaching an analogous result may be implemented to shift probabilities for obtaining certain results. For example, a sourcing deck may be maintained at a standard 52-card deck of poker cards, but certain cards are skipped over when dealt. Which cards are skipped over may be defined as part of the game. For example, one embodiment may allow the player to select certain cards that will not be dealt even though they arise in the otherwise normal course of the deal. For example, based on an awarded occurrence (e.g. a sub-symbol occurs), or wager amount, or prior result, or loss streak, or any other criteria, a player may be allowed to identify certain cards that will be skipped over on the deal. The player could select specific cards, card suits, card values or ranges thereof, non-face cards, etc. In other embodiments, the gaming system may perform the selection, such as identifying random cards to skip when dealing, or based on an event occurring cards within a certain range will be skipped when dealing (e.g. cards with card values 6-10), or the like. In still other embodiments, cards to be skipped during the deal may be fixed, where the deal-skipping feature is disabled until activated in connection with some triggering event.

Figure 8:
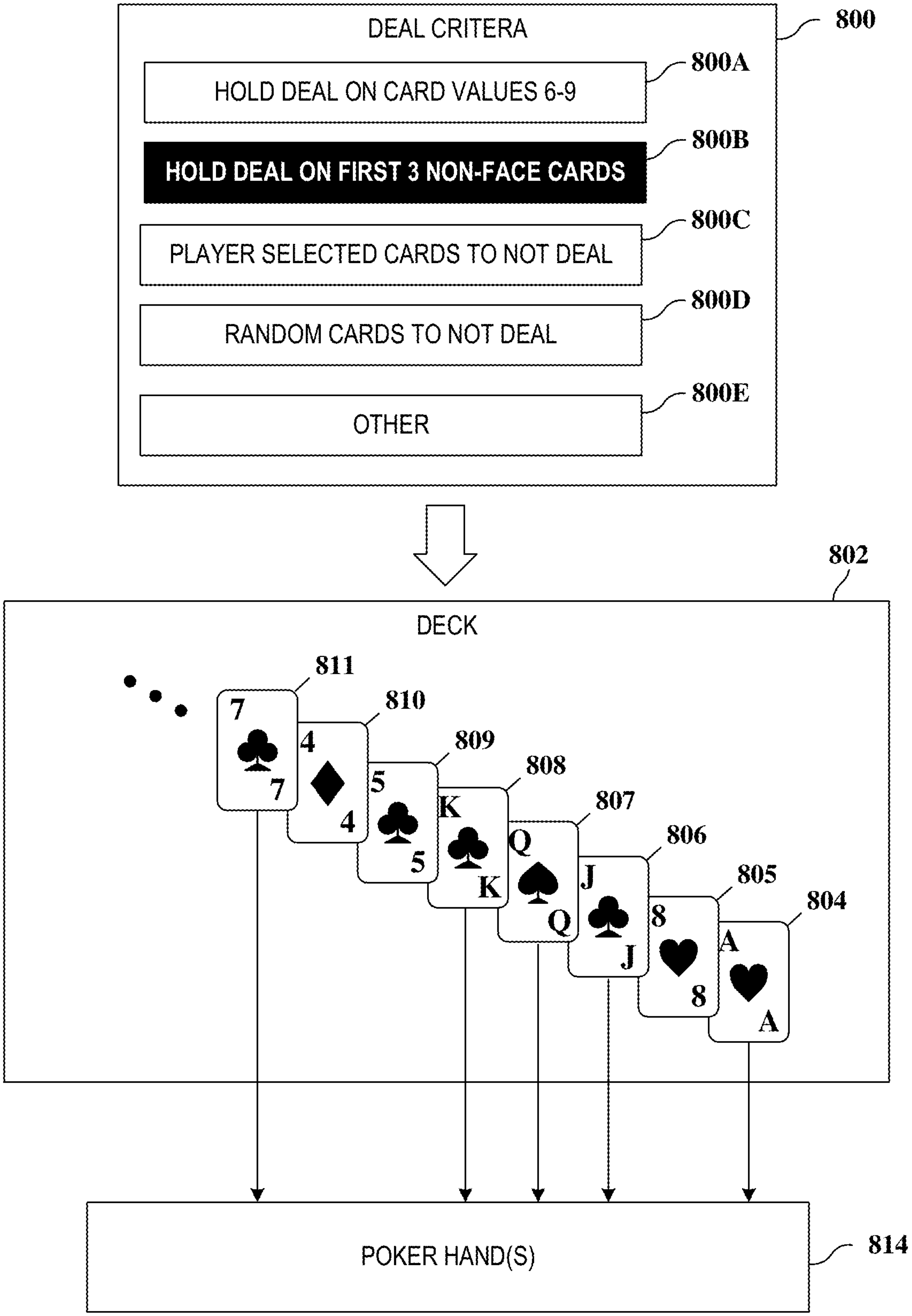
FIG. 8 is a diagram depicting a manner in which poker result probabilities may be shifted by manipulating the manner in which the cards are dealt rather than adding and/or removing cards from the sourcing deck.

FIG. 8 is a diagram depicting a manner in which poker result probabilities may be shifted by manipulating the manner in which the cards are dealt rather than adding and/or removing cards from the sourcing deck. Some deal criteria 800 may be established. As noted above, any desired manner of establishing such deal criteria 800 may be used, whether player-selected, fixed by the system, random selection by the system, etc.

Representative examples of deal criteria 800 include holding the deal of certain card values, such as card values 6-9 (800A), holding the deal of a defined subset of cards, such as all non-face cards, or a portion of non-face cards such as the first three non-face cards coming up in the deal (800B) in a multi-hand game, cards selected by the player not to deal (800C), random system-selected cards to not deal (800D), and/or any other desired criteria (800E). For purposes of example, FIG. 8 assumes that the deal will be held on the first three non-face cards 800B.

The sourcing deck 802 of cards includes the cards to be dealt in some order, most probably a random order. In this example, the original order of cards to be dealt is in the order of cards 804, 805, 806, 807, 808, 809, 810, 811, etc. Because this example assumes that the deal will be held on the first three non-face cards 800B, cards dealt to the poker hand(s) 814 (single-hand or multi-hand) will not deal the first three non-face cards that come up in the deal. Thus, in this example, card 804 (Ace of Hearts) will be dealt to poker hand(s) 814 because it is a face card, but the second card 805 (Eight of Hearts) that would have been dealt is instead held, and not dealt to poker hand(s) 814 because it is the first of three cards that is not a face card. Cards 806, 807 and 808 (Jack of Clubs, Queen of Spades, and King of Clubs respectively) will be dealt to poker hand(s) 814 since they are face cards. The next two cards 809, 810 (Five of Clubs and Four of Diamonds respectively) will not be dealt to poker hand(s) 814 because they represent the second and third of the three non-face cards that will not be dealt. Now that the criteria has been met (three non-face cards held and not dealt), the next card 811 (Seven of Clubs) will be dealt to the poker hand(s) 814, because it is the next card to deal and three non-face cards have already been skipped over. Accordingly, the player has now received cards in the poker hand that have shifted the probability of obtaining certain hands that involve face cards.

In other embodiments, rather than the "first" X cards (e.g. first three non-face cards), the deal criteria 800 may be to not deal certain cards on a list, such as any Sixes, Sevens, and Eights. This too shifts the chances of getting more face cards, and other cards that are not Sixes, Sevens, and Eights. In either case, the poker hand(s) 814 may or may not get the benefit of the skipping of cards if the cards to be skipped over would not otherwise be among the cards to be dealt before the recipient poker hand(s) 814 has received all of the cards needed to complete the game.

Such skipping of cards to deal may also be used on replacement or "draw" cards in a draw poker game or other poker game involving replacement cards. For example, the poker hand(s) 814 may receive an initial deal (with or without dealt card skipping), and the cards in the deck from which replacement cards will be dealt may skip cards in an analogous manner. For example, drawn cards could be subject to criteria that the first two draw cards that are not face cards will be skipped, or the like. Thus, FIG. 8 is applicable regardless of the stage of a poker game being played.

Thus, whether by adding cards to a deck, skipping cards to deal from a deck, or otherwise manipulating the cards that may be dealt in other ways, a "richer deck" may result that provides the player with a higher chance of obtaining winning results, better winning results, better associated payouts, etc.

Any desired wagering structure may be used, whether incorporated into a single wager to play the poker game, whether being eligible for the enriched deck feature involves an extra payment of some kind, etc. In one embodiment, there may be a first payment to play the poker game, and an additional payment to be eligible for the enriched deck features described herein. For example, in a 3-hand multi-play embodiment (i.e. a triple play poker game), a 5+5 wagering structure with enriched deck eligibility would cost the player a total of thirty credits for such 3-hand poker game, including five credits to play each of the three hands, plus five additional credits to be eligible for the deck enrichment feature for each of the three hands. However, the betting structure may be managed in any way desired, such as 5+0, 5+1, 5+2, 5+3, 5+4, 5+5, 5+45, etc.

Some embodiments may also be employed to determine whether an indication to enrich the deck (e.g. sub-symbol, mystery symbol; particular cards and/or poker results, etc.) will be active (thereby enabling the deck to be modified) or passive (thereby not enabling the deck to be modified). For example, the player may place additional wagers to activate card positions or card columns or hands, etc. If the indicators are randomly or otherwise provided in an activated card position or column, the indicator will be active, thereby enabling the subsequent hand benefit to be provided when a counter reaches its threshold. In such a case, there might be no additional general wager to be eligible for the subsequent hand benefit, but rather the additional wager(s) is to make eligible certain portions (subset or the entire set) of card positions in which received indicators activate the subsequent hand benefit features.

Thus, in connection with the present disclosure, single-hand or multi-hand poker games may be played. As one specific representative example, a single-hand video poker game may have a betting structure of 5+5 (e.g., five credits to play the poker game, and five credits to be eligible for the deck modification feature), where any Royal Flush cards presented in a player's hands are added to the deck for future poker games, such as for ten future poker games, at which time the deck resets to a prior state.

As another specific representative example, a multi-hand video poker game may have a betting structure of 5+5 (e.g., five credits to play each hand of the poker game, and five credits for each hand to be eligible for the deck modification feature, for a total of 30 credits in a triple-play embodiment). In one embodiment, any Royal Flush cards presented in any of the player's hands are added to the deck for future poker games, such as for ten future poker games, at which time the deck resets to a prior state. In other embodiments, the Royal Flush cards to be added to the deck may be limited to one or more of the played hands, or one or more of the card positions, etc.

As another specific representative example, a multi-hand video poker game may have a betting structure of 5+5, and any Aces presented in any of the player's hands are added to the deck for future poker games, such as for ten future poker games, at which time the deck resets to a prior state. In other embodiments, the Aces to be added to the deck may be limited to one or more of the played hands, or one or more of the card positions, etc.

As another specific representative example, a multi-hand video poker game may have a betting structure of 5+5, and the player picks a card(s) prior to the dealt hand being exposed to the player. If the card or cards selected by the player are presented in any of the player's hands, they are added to the deck for future poker games, such as for ten future poker games, at which time the deck resets to a prior state. In other embodiments, the player's selected cards to be added to the deck may be limited to one or more of the played hands, or one or more of the card positions, etc.

Figure 9A:
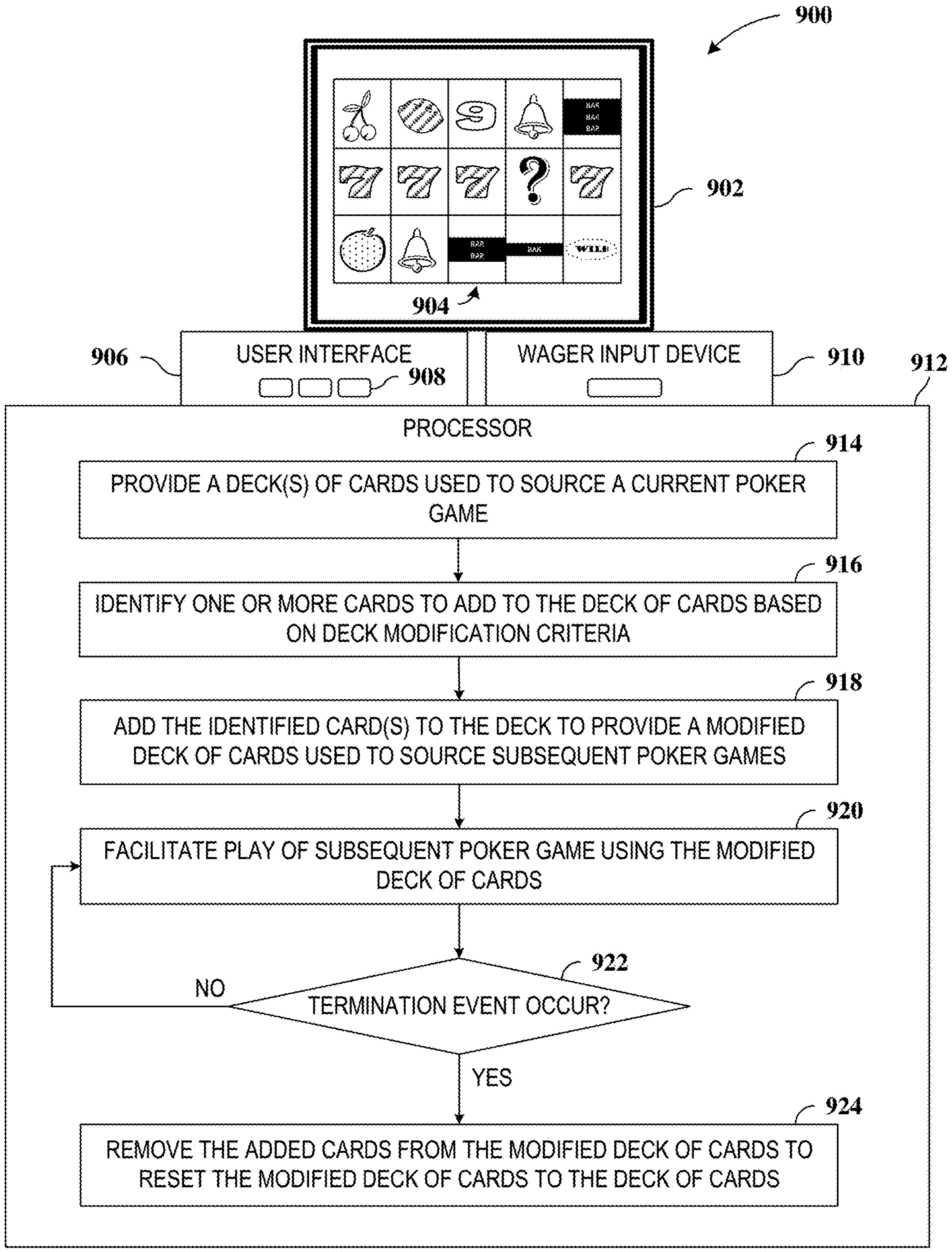
FIGS. 9A and 9B are diagrams of representative gaming apparatuses for enriching electronic/virtual decks of poker cards for use with at least subsequent poker hands.
Figure 9B:
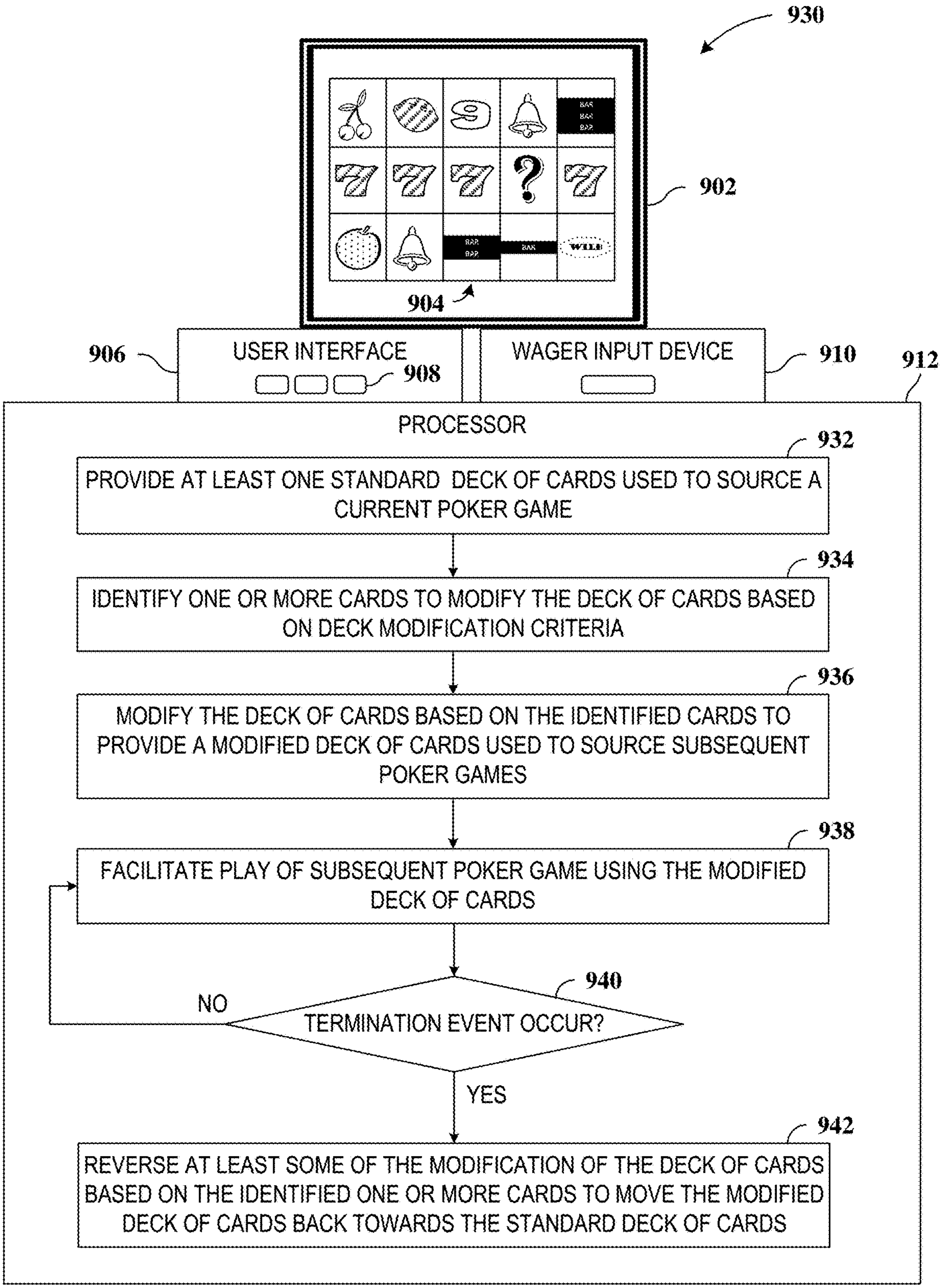

FIGS. 9A and 9B are diagrams of representative gaming apparatuses for enriching electronic/virtual decks of poker cards for use with at least subsequent poker hands. In the embodiment of FIG. 9A, a gaming device 900 for playing an electronic poker game is provided. The representative gaming device 900 includes at least a display(s) 9002 presenting a single or multiple poker hands 904. A user interface 906 is provided that includes at least one user input 908 to enable a player to initiate and participate in poker hands 904 presented via the display 902. A wager input device 910 may be provided, which may be structured to identify and validate player assets and ultimately permit the player to play the poker games/hands when the player assets are provided. FIG. 9A is described in terms of either a single-hand poker game or multi-hand poker game.

A processor 912 is configured to, in one embodiment, provide 914 a deck(s) of cards as a source of cards for a current poker game. The processor 912 is configured to identify 916 one or more cards to add to the deck of cards based on deck modification criteria, and to add 918 those identified cards to the deck to provide a modified deck of cards used to source one or more subsequent poker games. The processor 912 is configured to facilitate 920 play of the subsequent poker games using the modified deck of cards. The processor 912 monitors for occurrence of a termination event as determined at block 922, and if no termination event is identified, the player can continue to play poker games using the modified deck of cards. When the termination event occurs, the processor 912 is configured to remove the added cards from the modified deck of cards to reset the modified deck of cards to the deck of cards.

In the embodiment of FIG. 9B, a gaming apparatus 930 for playing an electronic poker game is provided. Utilizing like reference numbers to those of FIG. 9A where applicable, the representative gaming apparatus 930 includes at least a display(s) 902 presenting a single or multiple poker hands 904. A user interface 906 is provided that includes at least one user input 908 to enable a player to initiate and participate in poker hands 904 presented via the display 902. A wager input device 910 may be provided, which may be structured to identify and validate player assets and ultimately permit the player to play the poker game events when the player assets are provided.

A processor 912 is configured to, in one embodiment, provide 932 at least one standard deck of cards used to source a current one of the poker games. The processor 912 is configured to identify 934 one or more cards to modify the deck of cards based on deck modification criteria, and to modify 936 the deck of cards based on those identified one or more cards to provide a modified deck of cards to source one or more subsequent poker games. The processor 912 is configured to facilitate 938 play of the one or more subsequent poker games using the modified deck of cards. In response to determining 940 occurrence of a termination event, the processor 912 is configured to reverse 942 at least some of the modification made to the deck of cards, based on the identified one or more cards, to move the modified deck of cards back towards the standard deck of cards. Where it is determined 940 that no termination event occurred, the processor 912 continues to facilitate 938 play of subsequent poker games using the modified deck of cards in its current state.

The principles described herein may be applied to other games, such as keno, bingo, etc. For example, in the context of keno, a sequence of numbered balls may serve as the default set of numbers, and one or more of those numbers are duplicated one or more times to provide a modified source of keno numbers that redistributes the odds of getting numbers in the game. Thus, in an embodiment where the player was allowed to select one or more numbers to add to the keno number source, the player could pick that/those number(s) when playing the keno game, to increase the chances of winning since more than one of that/those number(s) exists in the keno number source.

Similar examples apply to bingo, where bingo number/letter combinations may be added to the source of bingo calls, whereby the player would have a higher likelihood of getting certain bingo positions filled. Thus, in an embodiment where the player was allowed to select one or more numbers to add to the bingo letter/number source, the player could pick that/those letter/number(s) when playing the bingo game, to increase the chances of winning since more than one of that/those letter/number combinations exists in the bingo game play item source.

The foregoing description of the representative embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention covers alternatives, modifications, and equivalents that come within the scope and spirit of the principles set out herein and/or in the appended claims.

What is claimed is:

1. A video poker machine comprising:

a gaming cabinet;

a display housed in the gaming cabinet;

a user interface attached to the gaming cabinet, the user interface configured to receive at least player input to facilitate player participation in the poker game;

a wager input device structured to identify and validate player assets, and to permit the player to participate in the poker games in which the player assets are provided;

a memory housed in the gaming cabinet, the memory configured to store a credit amount and a first deck of virtual playing cards;

a dedicated random number generator controller housed in the gaming cabinet; and a processor housed in the gaming cabinet, and connected to the display, the wager input device, the memory and the random number generator controller, the processor configured to:

receive a signal from the wager input device, the signal indicating receipt of a physical item associated with a currency value;

increase the credit amount stored in the memory based on the currency value associated with the received physical item;

receive a signal to initiate a first poker game event, where an amount wagered on the first poker game event is deducted from the credit amount stored in the memory;

display a first outcome using the first deck of cards on the display, the first outcome determined based on at least one value obtained from the random number generator;

provide awards associated with the first outcome;

identify one or more cards to add to the first deck of cards based on a deck modification criteria;

add the identified one or more cards to the deck of cards to provide a modified deck of cards;

receive a signal to initiate a second poker game event after any awards for the first poker game are provided, where an amount wagered on the second poker game event is deducted from the credit amount stored in the memory;

display a second outcome using the modified deck of cards on the display, the second outcome determined based on at least one value obtained from the random number generator; and provide awards associated with the second outcome.

2. The video poker machine of claim 1, wherein during the second poker game event, the processor is further configured to:

determine if a termination event has occurred;

facilitate play of one or more subsequent poker games using the modified deck of cards if it is determined that the termination event has not occurred; and remove the added cards from the modified deck of cards to reset the modified deck of cards to the deck of cards if it is determined that the termination event has occurred.

3. The video poker machine of claim 2, wherein the processor is further configured to remove one or more of the cards of the modified deck of cards in parallel with the capability to continue to add additional ones of the cards to the modified deck of cards.

4. The video poker machine of claim 2, wherein the termination event comprises a number of the subsequent poker games played, and wherein the processor is configured to remove the added cards from the modified deck of cards to reset the modified deck of cards to the deck of cards in response to the identification of the number of the subsequent poker games being played.

5. The video poker machine of claim 2, wherein the termination event comprises an expiration of a time period during play of the subsequent poker games, and wherein the processor is configured to remove the added cards from the modified deck of cards to reset the modified deck of cards to the deck of cards in response to the identification of the expiration of the time period.

6. The video poker machine of claim 2, wherein the termination event comprises a triggering event based on one or more cards occurring during play of the subsequent poker games, and wherein the processor is configured to remove the added cards from the modified deck of cards to reset the modified deck of cards to the deck of cards in response to the triggering event.

7. The video poker machine of claim 1, wherein the processor is configured to identify one or more cards to add to the deck of cards based on play-based deck modification criteria, wherein the play-based deck modification criteria is based on at least one or more of the cards involved in the first poker game event.

8. The video poker machine of claim 7, wherein the processor is configured to identify the one or more cards to add to the deck of cards by adding the cards of the current poker game that are involved in a winning outcome.

9. The video poker machine of claim 7, wherein the processor is configured to identify the one or more cards to add to the deck of cards by adding the cards of the current poker game that are face cards.

10. The video poker machine of claim 7, wherein the processor is configured to identify the one or more cards to add to the deck of cards by adding the cards of the current poker game that are among a predetermined group of one or more special cards.

11. The video poker machine of claim 1, wherein the processor is configured to identify the one or more cards to add to the deck of cards by adding the cards of the first poker game event that the player has previously designated as the cards to add when they arise in connection with the current poker game.

12. The video poker machine of claim 1, wherein the processor is configured to identify the one or more cards to add to the deck of cards based by adding the cards of the first poker game event that are marked by indicators.

13. The video poker machine of claim 1, wherein the first deck of cards is a standard deck of fifty-two cards of four card suits, each card suit including thirteen cards, and wherein the modified deck of cards comprises more than fifty-two cards with one or more of the cards of any of the card suits being duplicates.

14. The video poker machine of claim 1, wherein the first deck of cards is a standard deck of fifty-two cards of four card suits, each card suit including thirteen cards, and wherein the modified deck of cards comprises more than fifty-two cards with one or more of the cards being Wild cards.

15. The video poker machine of claim 1, wherein the first deck of cards is a standard deck of fifty-two cards of four card suits, each card suit including thirteen cards, and wherein the modified deck of cards includes fifty-two cards with one or more of the cards being replaced with Wild cards.

16. A video poker machine comprising:

a gaming cabinet;

a display housed in the gaming cabinet;

a user interface attached to the gaming cabinet, the user interface configured to receive at least player input to facilitate player participation in the poker game;

a wager input device structured to identify and validate player assets, and to permit the player to participate in the poker games in which the player assets are provided;

a memory housed in the gaming cabinet, the memory configured to store a credit amount and a first deck of virtual playing cards;

a dedicated random number generator controller housed in the gaming cabinet; and a processor housed in the gaming cabinet, and connected to the display, the wager input device, the memory and the random number generator controller, the processor configured to:

receive a signal from the wager input device, the signal indicating receipt of a physical item associated with a currency value;

increase the credit amount stored in the memory based on the currency value associated with the received physical item;

receive a signal to initiate a first poker game, where an amount wagered on the first poker game is deducted from the credit amount stored in the memory;

display a first outcome using the first deck of cards on the display, the first outcome determined based on at least one value obtained from the random number generator;

provide awards associated with the first outcome;

based on an occurrence of a first modification event, identify one or more cards to add to the first deck of cards based on a deck modification criteria, and add the identified one or more cards to the deck of cards to provide a first modified deck of cards;

facilitate play of the one or more subsequent poker games using the first modified deck of cards; and during play of the one or more subsequent poker games:

identify if a second modification event has occurred, and based on the occurrence of the second modification event, add one or more cards to the first modified deck of cards based on the deck modification criteria to provide a second modified deck of cards, and identify if a first termination event has occurred, and based on the occurrence of the first termination event, remove one or more cards from a current one of the first modified deck of cards or the second modified deck of cards to provide a third modified deck of cards.

17. The video poker machine of claim 16, wherein the first deck of cards is a standard deck of fifty-two cards of four card suits, each card suit including thirteen cards.

18. The video poker machine of claim 16, wherein the identified one or more cards to add to the first deck of cards based on the occurrence of the first modification event includes at least one wild card.

19. The video poker machine of claim 16, wherein the identified one or more cards to add to the first deck of cards based on the occurrence of the first modification event includes at least one card with a rank of Jack, Queen, King, or Ace.

* * * * *